United States Patent [19]

Cettl

[11] Patent Number: 4,538,333
[45] Date of Patent: Sep. 3, 1985

[54] APPARATUS FOR ASSEMBLING TWO TELESCOPING PARTS, OF WHICH AT LEAST ONE HAS A RADIALLY DIRECTED PROJECTION

[75] Inventor: Jindrich Cettl, Hilgertshausen, Fed. Rep. of Germany

[73] Assignee: Bayerische Motoren Werke AG, Fed. Rep. of Germany

[21] Appl. No.: 434,373

[22] Filed: Oct. 14, 1982

[30] Foreign Application Priority Data

Oct. 17, 1981 [DE] Fed. Rep. of Germany ....... 3141332

[51] Int. Cl.³ .............................................. B23P 11/00
[52] U.S. Cl. ......................................... 29/240; 29/244
[58] Field of Search ................ 29/240, 256, 234, 238, 29/244, 271; 81/473, 474, 475, 476

[56] References Cited

U.S. PATENT DOCUMENTS

| | | | |
|---|---|---|---|
| 1,094,978 | 4/1914 | Church | 29/256 |
| 1,813,219 | 7/1931 | Woernley | 29/256 |
| 2,549,820 | 4/1951 | Kinzle | 29/256 |
| 3,319,494 | 5/1967 | Ulbing | 81/476 |

FOREIGN PATENT DOCUMENTS 2323113 11/1973 Fed. Rep. of Germany .

Primary Examiner—James L. Jones, Jr.
Attorney, Agent, or Firm—Craig and Burns

[57] ABSTRACT

An installation for assembling two parts adapted to be telescoped one into the other, of which at least one part has a radially directed projection which, during assembly of the parts, engages into a correspondingly constructed recess of the other part, whereby the first part is nondisplaceably arranged and the second part is aligned with the first part, and finally the second part during rotation threof about its longitudinal axis and simultaneous axial displacement is assembled with the first part; the second part is thereby positioned by a retaining mechanism which positions the second part with respect to the first part in relation to the joining axis while a threaded spindle adapted to be driven by a motor and held by a rigid support cooperates with the second part by way of a spring-loaded compression mechanism; the threaded spindle is thereby equipped with a slippage clutch.

16 Claims, 11 Drawing Figures

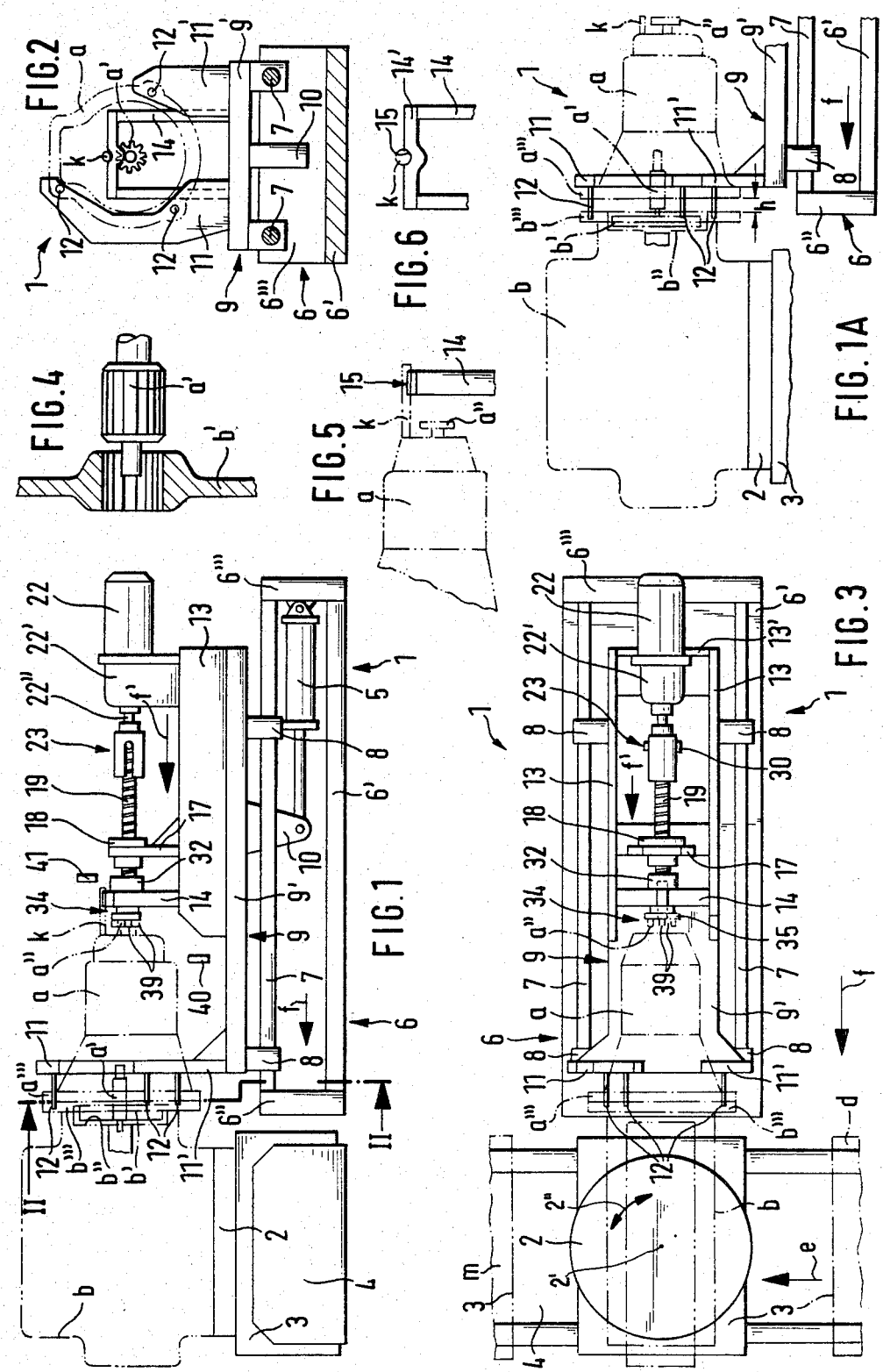

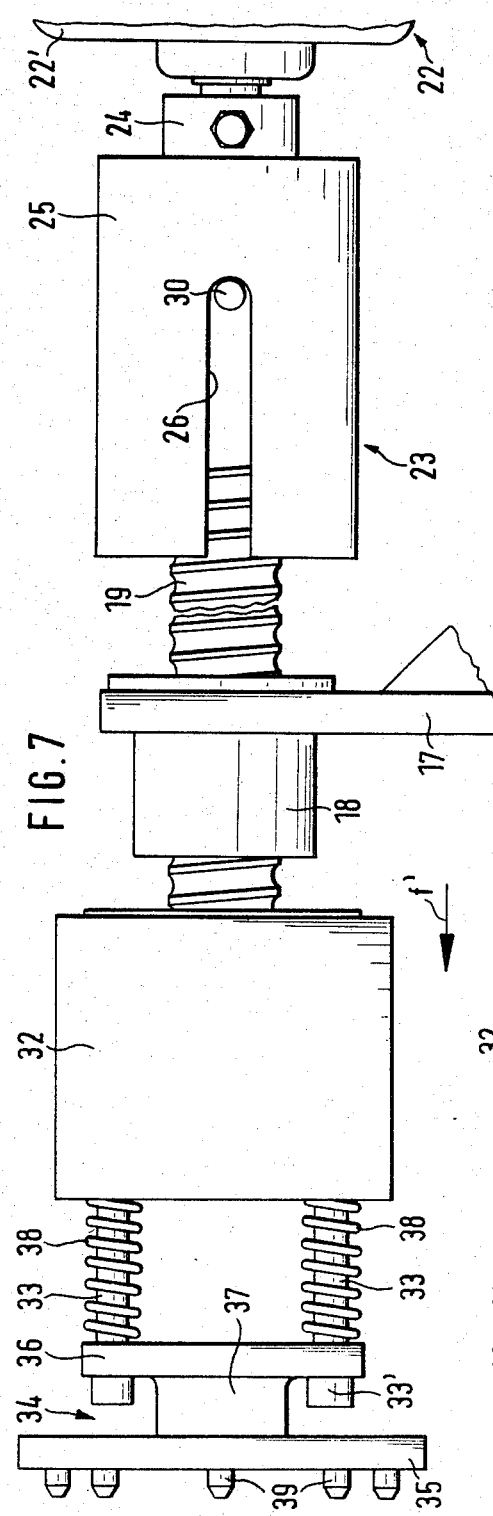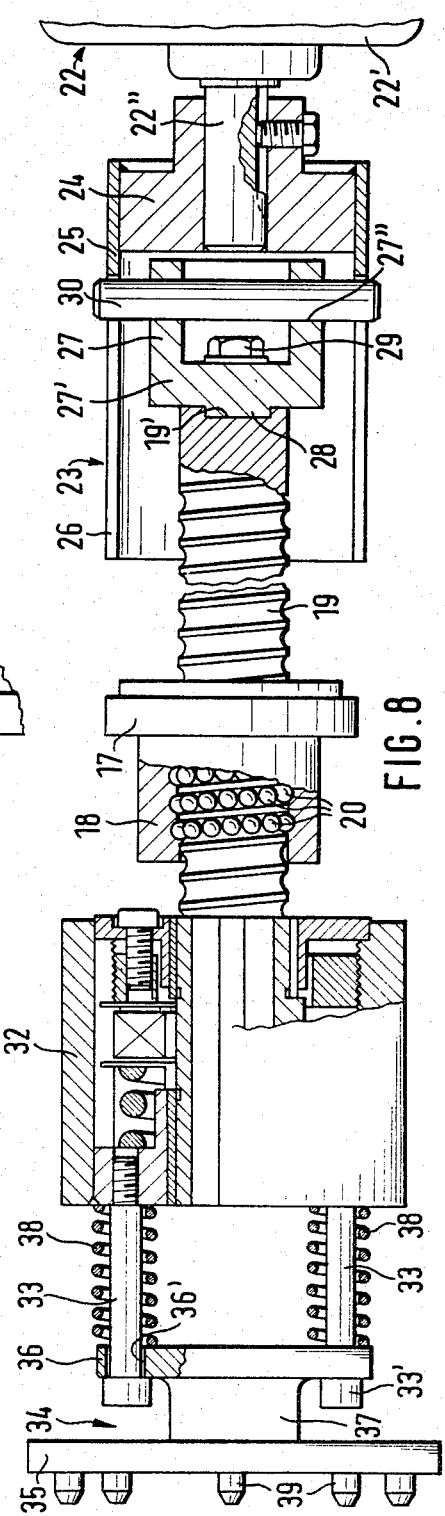

APPARATUS FOR ASSEMBLING TWO TELESCOPING PARTS, OF WHICH AT LEAST ONE HAS A RADIALLY DIRECTED PROJECTION

The present invention relates to an apparatus for assembling two parts adapted to be telescoped one into the other, of which at least one part has a radially directed projection.

During the assembling of motor vehicle engines and vehicle transmissions, customarily at first the motor vehicle engine provided with the friction clutch is arranged longitudinally displaceable on a guide track and thereupon the vehicle transmission is manually so arranged at the clutch friction disc of the friction clutch by means of an elevating or hoist mechanism that the transmission drive or input shaft provided with external teeth abuts end face at the coordinated internal teeth. Finally, the driving flange extending rearwardly from the vehicle transmission is manually rotated for such length of time until the external teeth of the transmission input shaft operatively connected therewith can be pushed into the internal teeth of the clutch friction disc, i.e., until tooth is aligned with tooth gap. This assembly method is not only difficult and time-consuming, but the toothed arrangement at one or the other assembly parts or also the guide bearing at the motor vehicle engine may be damaged very readily, as well as the transmission input shaft may be bent since in that case the axes of rotation of the assembly parts cannot be arranged accurately aligned with each other or can be so arranged only with a non-acceptable high expenditure of time.

Accordingly, it is the principal object of the present invention to provide an installation, by means of which two parts constructed in the manner indicated above can be assembled highly automatically in a rational manner.

The underlying problems are solved according to the present invention in that a retaining mechanism is provided receiving one of the two parts and positioning the same with respect to the other part in relation to the joining axis, and in that a threaded spindle adapted to be driven and retained by a fixed support, which is equipped with a slippage clutch, is provided, which cooperates with the other part by way of a spring-loaded member.

One embodiment of the present invention essentially resides in that one of the two parts is the transmission input shaft provided in its end section with external teeth and built into a vehicle transmission whereas the other part involves the clutch friction disk of a friction clutch provided on a motor vehicle engine whereby the friction disk is provided with internal teeth receiving the external teeth of the transmission input shaft.

By the use of the installation according to the present invention, two assembly parts can be assembled intensive and fully automatically, whereby these parts are advantageously also not damaged and work forces can be economized too. Furthermore, the installation according to the present invention in its use for assembling the aforementioned parts, also contributes to humanizing the entire working process.

These and other objects, features and advantages of the present invention will become more apparent from the following description when taken in connection with the accompanying drawing which shows, for purposes of illustration only, one embodiment in accordance with the present invention, and wherein:

FIG. 1 is an overall front elevational view of the installation in accordance with the present invention, whereby the assembly parts to be joined are in their end position;

FIG. 1a is a partial elevational view of the installation illustrated in FIG. 1, in which the assembly parts are shown immediately prior to being pushed together;

FIG. 2 is a cross-sectional view taken along line II—II of FIG. 1;

FIG. 3 is a plan view on FIG. 1;

FIG. 4 is a partial cross-sectional view through the area of a clutch friction disk and the end section of a transmission input shaft, which are assembled by means of the installation according to the present invention;

FIG. 5 is a partial view, on an enlarged scale, of the vehicle transmission shown in FIG. 1 together with a U-shaped support bracket;

FIG. 6 is a side elevational view of FIG. 5;

FIG. 7 is an elevational view, on an enlarged scale, of the threaded spindle shown in FIG. 1, with the machine parts arranged at the end sections thereof and the partially illustrated retention device;

FIG. 8 is a plan view on FIG. 7 whereby the machine parts arranged at the threaded spindle are shown partially in longitudinal cross section;

Figure 9:
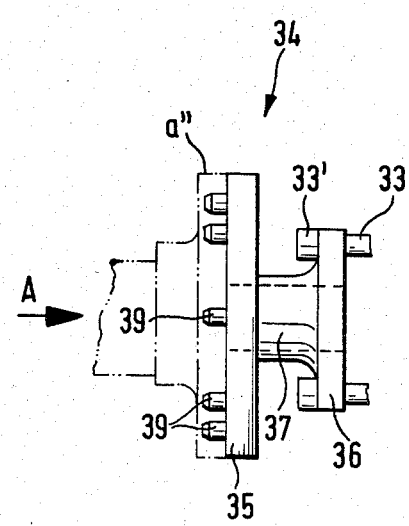
FIG. 9 is a partial elevational view, on a smaller scale, of the clutch disk shown in FIG. 7.

Referring now to the drawing wherein like reference numerals are used throughout the various views to designate like parts, reference numeral 1 generally designates in FIGS. 1 to 3 the installation for assembling two telescoping parts in accordance with the present invention, by means of which the input shaft a' of a vehicle transmission a, which is provided with a longitudinally extending externally toothed arrangement—constructed, for example, as serration or spline-shaft profile—is introduced into the correspondingly constructed internally toothed arrangement of the clutch friction disk b' of a friction clutch b" attached to a motor vehicle engine b. The motor vehicle engine b rests under interposition of a plate 2 on a carriage 3 which is displaceable along a guide track 4 extending perpendicularly to the axis of rotation—however, in the plane thereof—of the clutch friction disk b' and of the transmission input shaft a'. As a result of the longitudinally displaceable arrangement of the motor vehicle engine b, the latter can be assembled with the vehicle transmission a far-reachingly automatically, stepwise and thus rationally by means of the installation 1 in accordance with the present invention to be described more fully hereinafter.

The installation 1 includes a support frame generally designated by reference numeral 6 having a rectangularly shaped base plate 6', on which is provided a front wall 6" and a rear wall 6''', whereas the sides of the base plate 6' extend parallelly to the axes of rotation of the transmission input shaft a and of the clutch disk b, respectively, to the longitudinal center axis of other parts to be assembled. The support frame 6 is provided at its top side with two guide beams 7, on which a feed carriage 9 is longitudinally displaceable by way of two guide bearings 8 disposed at a distance from one another. The feed carriage 9 is displaced in the longitudinal direction by a driving or actuating motor 5 constructed as pneumatic cylinder—or also as hydraulic cylinder—which is pivotally connected, on the other hand, at the rear wall 6''' of the support frame 6 and, on the other, at a connecting part 10 projecting downwardly from the rectangularly shaped bearer plate 9' of the feed carriage 9.

According to an embodiment of the present invention a feed carriage positioned at 2, FIG. 3 may also be provided which is pivotal, as shown by arrow 2'' about a pivot axis 2' extending perpendicularly to the longitudinal center axis (respectively, axis of rotation of transmission input shaft a' and clutch friction disk b') of the parts to be joined and is displaceable corresponding to the direction of the longitudinal center axis. A feed carriage constructed in such a manner is particularly of advantage if the vehicle transmission a or an analogous part to be assembled is to be installed into the installation 1 and to be removed therefrom by a robot.

A retaining device consisting of two mounting plates 11 and 11' is attached at the forward end area of the bearer plate 9' of the feed carriage 9 facing the guide track 4, whereby the mounting plates 11 and 11' extending with the plane thereof perpendicular to the plane of the bearer plate 9' project therefrom in the upward direction. The mounting plate 11 respectively 11' is provided with two respectively, one mounting bolts 12 which are each coordinated to a through-bore at the flange a''' of the vehicle transmission a and at the flange b''' of the motor vehicle engine b and which have such a diameter that they can be introduced accurately fitting into the through-bores. Since the free end sections of the bolts 12 are constructed conically shaped, they can be introduced without problem self-centering into the through-bores of the flanges a''' and b'''. The lengthwise extension of the bolts 12 projecting beyond the mounting plates 11 and 11' corresponds approximately to the dimension of the thickness of the flanges a''' and b''' plus a distance h (FIG. 1a). The vehicle transmission a can be introduced rapidly and without difficulty into a retaining mechanism constructed in this manner and is thereby adjusted positionally accurately to the corresponding position of the oppositely disposed flange b''' of the motor vehicle engine b since the through-bores of the flanges a''' and b''' have the same aperture image, i.e., are aligned with each other. The feed carriage 9 is provided along its side with mutually oppositely disposed bearer walls 13, in whose end areas facing the mounting plates 11 and 11' is attached a U-shaped support bracket 14, FIG. 2, whose center web 14' bridging the two bearer walls 13 has a concave groove 15 (FIG. 5) extending parallelly to the longitudinal direction of the bolts 12. Since the shifting rod k projecting rearwardly from the vehicle transmission a rests in the groove 15 (FIGS. 1, 5 and 6), the transmission is supported at two points disposed at a relatively large distance from one another, namely, on the one hand, at its flange a''' by the mounting bolts 12 and, on the other, by the mounting bracket 14 with the shifting rod resting on the same. A retaining bracket 17 is attached adjacent the U-shaped mounting bracket 14 on the bearer plate 9' of the feed carriage 9 between the bearer walls 13; a guide nut 18 formed as flange bushing is nonrotatably inserted into the upper end area of the bracket 17 whereby the guide nut 18 is constructed as a ball circulation nut. A threaded spindle 19 is screwed into the guide nut 18, whereby the screw thread pitch of the spindle 19, as also the screw thread pitch of the guide nut 18, are constructed concavely semicircularly shaped in the cross section of the thread profile, corresponding to the radius of the balls 20 inserted into the guide nut 18 (FIG. 8). Since the threaded spindle 19 cooperates during the rotation about its axis of rotation with the guide nut 18 by way of the balls 20 disposed therebetween, a rolling friction results between the two parts, owing to which the threaded spindle 19 exhibits low self-jamming and therewith a great ease of motion during the rotation abouts its axis of rotation. The threaded spindle 19 is so arranged on the feed carriage 9 by way of the retaining bracket 17 that its axis of rotation is aligned with the axis of rotation of the drive flange a'', of the transmission input shaft a' and of the clutch friction disk b', respectively, with the center longitudinal axis of any other parts to be joined which are constructed differently.

A driving motor 22 equipped with a speed-reduction gear 22' is mounted on a rear wall 13' connecting the bearer walls 13 as well as on the bearer plate 9'; the drive clutch generally designated by reference numeral 23 is secured to the drive shaft 22'' of the driving motor 22. As can be seen from the enlarged view (FIG. 8) of the drive clutch 23, the latter includes a disk-shaped fastening hub 24 connected with the drive shaft 22'' by means of an adjusting spring and an adjusting bolt. The fastening hub 24 is welded together in its rear end section with a hollow cylindrical sleeve 25 surrounding the threaded spindle 19 with radial play; the sleeve 25 is provided with two diametrically opposite longitudinal slots 26 extending up to near the fastening hub 24. The threaded spindle 19 carries at its end face facing the drive clutch 23 a hollow cylindrical mounting member 27 which is provided with a bottom 27'. A nose-like projection 28 extending transversely to the axis of rotation of the mounting member 27 projects from the bottom 27'; the nose-like projection 28 engages in a correspondingly constructed groove 19' provided at the end face of the threaded spindle 19, whereby the mounting member 27 and the threaded spindle 19 are screwed together by means of a bolt 29. The shank of the mounting member 27 is traversed by a mounting bore 27'' extending perpendicularly to the axis of rotation thereof, whereby a cross pin 30 engaging into the two longitudinal slots 26 of the cylindrical sleeve 25 is rigidly inserted into the mounting bore 27''; the cross pin 30 is thereby slightly longer than the outer diameter of the sleeve 25. The drive clutch 23 which is constructed in the manner described hereinabove and composed of the parts 24, 25, 27 and 30 can be manufactured and assembled in a simple manner and is hardly ever prone to trouble in operational use.

Figure 10:
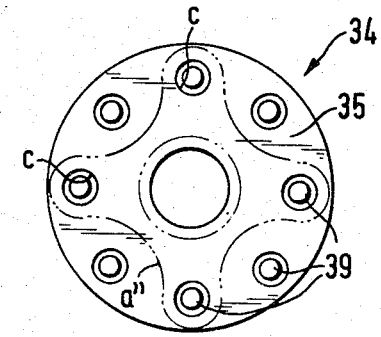
FIG. 10 is an elevational view of the clutch disk, as viewed in the direction of arrow A of FIG. 9.

A slippage clutch generally designated by reference numeral 32 is nonrotatably secured at the threaded spindle 19 at the end section thereof opposite the driving clutch 23; the slippage clutch 32 includes a mechanically or electrically constructed adjusting mechanism of any known type for a given torque to be transmitted during operation of the installation 1. A torque matched to the parts to be respectively joined (for example, transmission input shaft a' and clutch friction disk b') is adjustable at the slippage clutch 32 by the adjusting mechanism. The slippage clutch 32 is provided on its end face opposite the threaded spindle 19 with four rigidly inserted spacer bolts 33 arranged at equal angular distances from one another and disposed on a common circle; the spacer bolts 33 carry at their free ends a clutch disk generally designated by reference numeral 34 in an axially displaceable manner. The clutch disk 34 essentially consists of an external pin disk 35 serving as engaging element and of an inwardly disposed bearer disk 36 extending at a parallel distance with respect thereto; the bearer disk 36 is connected with the pin disk 35 by way of a central extension 37. The through-bores 36' provided in the bearer disk 36 and receiving the spacer bolts 33 have a radial clearance with respect to the latter, whence the clutch disk 34 can be axially displaced. One bolt head 33' each or the like which cooperates with the inwardly disposed end face of the bearer disk 36, is provided at the free end of the spacer bolts 33; the clutch disk 34 is pressed in its normal position against the bolt heads 33' by four compression springs 38 surrounding a respective one of the spacer bolts 33. The compression springs 38 are supported, on the one hand, against the free end face of the slippage clutch 32 and, on the other, act against the bearer disk 36. Since the clutch disk 34 is guided during its axial displacement by way of four spacer bolts 33 disposed relatively far from one another, its plane cannot be canted in relation to the end face of the slippage clutch 32. As shown in FIG. 10, the pin disk 35 is provided with eight entrainment pins 39 projecting from its outwardly disposed end face, which are located on a common circle corresponding to the circle of the through-bores c at the drive flange a", and which are arranged at the same angular distance from one another; furthermore, the free end sections of the entrainment pins 39 are constructed conically shaped (FIG. 9) whereas their diameter is slightly smaller than the diameter of the through-bores c. For the rotation of the drive flange a" which projects rearwardly from the vehicle transmission a, about its axis of rotation (FIGS. 1, 5 and 9) and therewith for the rotation of the transmission input shaft a' which is operatively connected with the drive flange a" by appropriate gearing about its axis of rotation, it is necessary that the pin disk 35 of the clutch disk 34 cooperates nonrotatably with the driving flange a". For that purpose, the entrainment pins 39 are coordinated to the through-bores c at the driving flange a" and engage during operation of the installation 1 into the through-bores c. However, the entrainment pins 39 may also abut against the radially projecting arms of the driving flange a". As a result thereof, the number of the provided entrainment pins 39 is equal to or twice as large as the number of the through-bores c at the driving flange a". However, if the number of entrainment pins 39 is twice as large as the number of through-bores c present in the driving flange a", the clutch disk 34 can be brought into engagement with the driving flange a" much more rapidly during operation of the installation 1 than with a number of entrainment pins 39 corresponding to the number of through-bores c.

Two limit switches 40 and 41, FIG. 1, constructed appropriately as contactless switch elements are mounted at the feed carriage 9, whereby the feed movement of the threaded spindle 19 is interrupted by the limits switch 40 after the transmission input shaft a' is completely pushed into the clutch friction disk b', and the threaded spindle 19 is thereafter rotated back into its starting position. After new parts to be joined by means of the installation 1 of the present invention are brought into their position on the carriage 3 and in the installation 1, the threaded spindle 19 is again controlled in its starting position by the limit switch 41 and is again moved forward. In order to be able to adjust the limit switches 40 and 41 in an uncomplicated manner to different length dimensions of the parts to be joined (transmission input shaft a' and clutch friction disk b'), the limit switches 40 and 41 are appropriately threadably secured at the feed carriage 9 so as to be adjustable in the longitudinal direction. The limit switches 40 and 41 contribute to the far-reaching automated operation of the installation 1.

OPERATION

The operation of the described installation 1 in accordance with the present invention is as follows.

Prior to the assembly of the vehicle transmission a and of the motor vehicle engine b, the latter is arranged on the carriage 3 which is thereby appropriately in the position illustrated in FIG. 3 which is disposed adjacent the neighboring installation 1. Thus, a free access exists to the end face of the installation 1 so that the flange a''' of the vehicle transmission a can be arranged at the end face of the mounting plates 11 and 11'—either manually or by robot—whereby the flange a''' is pushed with its through-bores over the mounting bolts 12 coordinated thereto so far until its back side abuts at the mounting plates 11 and 11'; the shifting rod k of the vehicle transmission a thereby rests on the support bracket 14. Thereupon, the carriage 3 carrying the motor vehicle engine b is displaced in the direction e into the assembly position illustrated in FIG. 3 which is appropriately limited by an abutment, by way of a program control of any known type and therefore not described in detail herein, which controls the carriage 3 and the feed carriage 9 by way of the adjusting motors; in this assembly position, the through-bores provided at the flange b''' of the motor vehicle engine b are aligned with the through-bores at the flange a''' of the motor vehicle transmission a. The feed carriage which carries the vehicle transmission a and which had previously been pushed back, is thereupon displaced longitudinally in the direction of arrow f by a control pulse of the mentioned program control by extending the piston rod of the adjusting motor 5 until the mounting bolts 12 project with their free conically shaped end sections into the through-bores at the flange b'''of the motor vehicle engine ("pointing"), so that the motor vehicle transmission a and the motor vehicle engine b are positioned accurately to one another in relation to their joining axis; the feed carriage 9 remains in this sliding position illustrated in FIG. 1a, up to the abutment of the flange a''' of the vehicle transmission a at the flange b''' of the motor vehicle engine b as will be described more fully hereinafter. The spacing dimension h which results thereby between the mutually facing end faces of the flanges a''' and b''' and which amounts to about 25 mm. (FIG. 1a) is thereby so dimensioned that the end face of the transmission input shaft a' is about 2 to 3 mm. away from the facing end face of the clutch disk b' (FIG. 4), whence existing dimensional tolerances in the assembly parts can be compensated for; furthermore, the spacing dimension h corresponds approximately to the length dimension of the hub of the clutch friction disk b' provided with the internally toothed arrangement.

After positioning of the vehicle transmission a and of the motor vehicle engine b by way of the mounting bolts 12, a control pulse is fed from the limit switch 41 to the driving motor 22, as a result of which the speed reduction gear 22' thereof drives the threaded spindle 19 with about 16 rpm, under interconnection of the driving clutch 23. Since the threaded spindle 19 is retained by the retaining bracket 17 secured at the feed carriage 9, the threaded spindle 19 during rotation about its axis of rotation in the clockwise direction is threadably extended in the direction of arrow f' by way of the guide nut 18—whereby the cross pin 30 slides along the longitudinal slots 26 of the sleeve 25; as a result thereof, the entrainment pins 39 of the clutch disk 34 finally engage in the radially directed arms or the through-bores c of the facing driving flange a'' of the vehicle transmission a and ultimately the clutch disk 34 abuts at the driving flange a''. Since the threaded spindle 19 thereby continued to be driven and thus continues to be extended, on the one hand, the transmission input shaft a' of the vehicle transmission a which is in gearing connection with the driving flange a'' is driven therewith and, on the other hand, the transmission a is displaced in the direction of arrow f' along the bolts 12 whereby at the same time the compression springs 38 provided between the slippage clutch 32 and the clutch disk 34 are somewhat compressed. Since, in most cases, during the subsequently occurring abutment of the end face of the transmission input shaft a' at the facing end face of the clutch friction disk b', the transmission input shaft a' has such a rotational position that the teeth, respectively, splines of its spline-shaft profile or the like do not engage into the coordinated tooth gaps of the internally toothed arrangement of the clutch friction disk b', the end face of the teeth of the spline-shaft profile—as a result of continued longitudinal displacement of the vehicle transmission b during extension of the threaded spindle 19—is pressed for a short period of time against the end face of the internally toothed arrangement of the clutch friction disk b'. As a result thereof, the compression springs 38 are continued to be stressed for such length of time until the teeth of the spline-shaft profile of the transmission input shaft a' which thereby continues to rotate about its axis of rotation, are in a congruent position to the coordinated tooth gaps of the internal teeth or the clutch friction disk b'. In this rotational speed of the transmission input shaft a', the compression springs 38 which have been prestressed in the manner described above, can unstress or release themselves instantaneously and displace thereby the vehicle transmission a along the bolts 12 whereby the tooth profile of the transmission input shaft a' is pushed into the internally toothed arrangement of the friction disk b' and thus the two assembly parts are in form-locking engagement with one another. Since during this assembly operation, the friction clutch disk b'' is "clutched-in" or engaged, i.e., the clutch friction disk b' thereof is secured against rotation, the slippage clutch 32 adjusted to a corresponding torque responds after the form-locking inter-engagement of transmission input shaft a' and clutch friction disk b', as a result of which the rotation of the axially displaceable clutch disk 34 which had existed up to that time, is interrupted. The vehicle transmission a is now longitudinally displaced by the threaded spindle 19 which continues to rotate and therewith continues to extend so far— whereby the part of the slippage clutch 32 which is connected with the same rotates whereas the part connected with the clutch disk 34 stands still—until its flange a''' abuts at the flange b''' of the motor vehicle engine b (FIGS. 1 and 3); the transmission input shaft a' is thereby also completely pushed into the internally toothed arrangement of the clutch friction disk b'.

In this displaced position of the vehicle transmission a, the rotation of the threaded spindle 19 and therewith its forward feed movement is interrupted by the limit switch 40 and by an appropriate reversing control of the driving motor 22 the threaded spindle is rotated in the counterclockwise direction and therewith is rotated back into its starting position in a direction opposite the direction of arrow f'. Simultaneously therewith, also the feed carriage 9 is displaced back into its starting position in a direction opposite the direction of arrow f by way of the correspondingly controlled program control. New parts to be joined may now be placed on the installation 1 and, after displacement of the carriage 3, on the latter.

The motor vehicle engine b provided with the vehicle transmission a assembled thereto in the described manner by a far-reachingly automated assembly operation is thereupon further displaced by way of the carriage in the direction of arrow e along the guide track 4 into the displacement position m thereof, in which the flange a''' of the vehicle transmission a is bolted together with the flange b''' of the motor vehicle engine b by bolts inserted into the through-bores thereof.

In the event the transmission input shaft a', during its rotation about its axis of rotation and during longitudinal displacement directed toward the clutch friction disk b' should coincidentally have such a rotational position that the teeth of its spline-shaft profile are congruent to the coordinated tooth gaps of the internally toothed arrangement of the clutch friction disk b', then the transmission input shaft a' is immediately pushed into the internally toothed arrangement of the clutch friction disk b' by an unstressing of the compression spring 38 so that the slippage clutch 32 responds. The further assembly operation of the vehicle transmission a takes place in the manner described hereinabove.

With a correspondingly selected spring force of the compression springs 38, assembly parts also provided with a tight fit can be telescoped into one another by means of the installation 1 according to the present invention.

Furthermore, also assembly parts having inclined teeth can be joined together by means of the installation 1 of the present invention. With this type of teeth, the part of the slippage clutch 32 which is operatively connected with the axially displaceable clutch disk 34 is rotated about its axis of rotation during the telescoping or sliding together of the assembly parts.

Of course, any other assembly parts can be joined together in accordance with the present invention by a corresponding construction of the retaining mechanisms.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An installation for assembling two parts adapted to be telescoped into one another, of which one part includes an axially directed projection which during telescoping of the parts engages into a correspondingly constructed recess of the other part, comprising means for holding a first one of said two parts against axial displacement, means for aligning the second part with the first part, means for rotating the second part about its longitudinal axis and for simultaneously axially displacing the second part to assemble the second part with the first part, retaining means for receiving the second part and for positioning the second part with respect to the first part in relation to a longitudinal center axis, spring loaded compression means for engaging the second part, slippage clutch means for engaging the spring loaded compression means, and threaded spindle means held by a rigid mounting means, for driving the slippage clutch means wherein the second part is a transmission input shaft installed in a vehicle transmission, the transmission input shaft comprising external toothed means, the first part comprising a clutch friction disk of a friction clutch means provided on a motor vehicle engine, the friction disk comprising internal toothed means receiving the external toothed means of the transmission input shaft, and wherein the retaining means comprises mounting plates arranged at the forward edge of the feed carriage means having a substantially rectilinear outer configuration, extending perpendicularly to the plane of the feed carriage means, and the retaining means further comprises three forwardly projecting mounting bolts means coordinated each to a through-bore means at a transmission flange means as well as at an engine flange means, the mounting bolt means having free end sections constructed conically shaped.

2. An installation according to claim 1, further comprising mutually opposite bearer wall means disposed at the sides of the feed carriage means, an essentially U-shaped mounting bracket means provided at the forward end areas of the bearer wall means and having center web means for bridging the two bearer wall means and also having a longitudinally extending concave groove for placing thereon a shifting rod projecting rearwardly from the vehicle transmission.

3. A device for fitting together two parts, one inserted into another, a first part of which comprises at least one projection radially positioned with respect to a joining axis which, when the parts are inserted one into another, engages in a corresponding recess of the second part, the device comprising a holding means for receiving the first part positioned with respect to the joining axis, means for rotating the first part around the joining axis, a motor means, a receiving means, a support means actuated by the motor means and comprising a screw spindle screwably disposed in said receiving means for sliding the screw spindle along the joining axis, a sliding clutch means actuated by the screw spindle, a pressure spring means actuated by the sliding clutch means, a thrust means supported against the pressure spring meand and responding to the sliding clutch for causing insertion of one of said two parts into the other of said two parts.

4. A device according to claim 3, further comprising a receiving frame extending in parallel to the joining axis of the first and the second part and two guide rods arranged on top of the frame and spaced a distance from one another and parallel to the joining axis, an advancing carriage means carrying the holding means and being longitudinally slidable on said guide rods via by means of two guide bearings, an operating motor means coupled at a pushing part projecting downward from the advancing carriage for sliding the advancing carriage means and the receiving means comprises a guide-nut means for receiving the screw spindle.

5. A drive according to claim 3, further comprising a carriage means mounting the second part for rotation about a swivel axis extending vertically with respect to the joining axis of the first and the second part and means for shifting the carriage means to align the second part with the joining axis.

6. A device according to claim 3, the motor means further comprising a drive shaft of a driving motor provided with a step-down gear has a starting clutch interacting with the screw spindle, said starting clutch comprising a disk-shaped mounting hub connected with the drive shaft and of a hollow cylindrical shell surrounding the screw spindle with a radial play, said shell having two diametrically opposite longitudinal slots extending close to the mounting hub arranged at the drive motor end section of the shell, a cross pin provided at the end section of the screw spindle engaging in at least one of said longitudinal slots.

7. A device according to claim 6, the motor means further comprising a hollow cylindrical receiving part provided with a base on an end of the screw spindle and mounted to the end of the screw spindle facing the driving motor, from the base of said receiving part a nose-shaped projection extending transversely to the rotational axis of the receiving part, said projection engaging in a correspondingly developed groove provided at the drive motor end of the screw spindle, and a bore hole means penetrating the receiving part and extending transversely to an axis of rotation of the receiving part for receiving a cross pin rigidly inserted therein.

8. A device according to claim 4, the receiving means further comprising a support bracket means mounted to the advancing carriage means for receiving the guide nut means, said guide nut means comprising a ballscrew nut.

9. A device according to claim 3, wherein the sliding clutch means comprises means for adjusting the magnitude of torque transferred.

10. A device according to claim 3, wherein the axially shiftable thrust means has an outside plate with studs serving as an engaging element and an inside disk plate extending parallel at a distance to said plate having studs and being connected with said plate via a central extension, said support disk having several passage boreholes arranged at an equal angular distance about the longitudinal axis, said passage boreholes being penetrated with radial play by distance pins in the sliding clutch which pins, at their free end sections thereof, have at least one of a screw head, cross pin and similar device interacting with the inner front side of the support disk, where the distance pins are, in each case surrounded by a said pressure spring means which, on the one hand, rests against the free front side of the sliding clutch and, on the other hand, against the support disk.

11. A device according to claim 3 for inserting an end section of a drive shaft of a vehicle gearing provided with an external toothing into the internal toothing of a clutch friction plate of a friction clutch disposed at a motor vehicle engine, wherein the motor vehicle engine carrying the friction clutch rests on a carriage which can be slid along a slide way extending perpendicularly to the axis of rotation of the clutch friction plate and a gear drive shaft.

12. A driving according to claim 4, wherein the holding means comprises two receiving plates arranged at the front edge of the advancing carriage extending vertically, a plurality of receiving bolts provided in the receiving plates projecting toward the second part and being in each case assigned to a passage borehole each at a gearing flange and at an engine flange, the free end sections of said receiving bolts in each case being conical.

13. A device according to claim 4, wherein at the broad sides of the advancing carriage means, support walls are located that are opposite one another, at the front end section of which a U-shaped bearing hoop is provided which, with a center bar thereof, spans the suppoert walls, the center bar of said hoop having a longitudinally extending concave groove for the support of a selector shaft projecting from vehicle gearing toward the screw spindle.

14. A device according to claim 3, wherein a stud plate of the axially movable thrust means has at least three studs projecting from an exterior front side of the thrust piece and being arranged on a circle end at an equal angular distance from one another, said studs being assigned to the passage boreholes at a driving flange of a motor vehicle gearing that projects toward the stud plate and is star-shaped, where the number of studs is equal to or twice as large as the number of passage boreholes at the driving flange.

15. A device according to claim 4, further comprising
first end switch means interrupting advance of the screw spindle after one of the completed insertions of the first and the second part, and the completed insertion of a gear drive shaft into a clutch friction plate, for returning the screw spindle to a starting position, and
a second stationary end switch means for advancing the screw spindle forward.

16. A device according to claim 15, wherein the first and second end switch means are developed as non-contact switch elements.

* * * * *